Patented Oct. 21, 1930

1,779,274

UNITED STATES PATENT OFFICE

LLOYD T. HOWELLS, OF CLEVELAND, OHIO, ASSIGNOR TO THE ELECTRIC SMELTING & ALUMINUM COMPANY, OF CLEVELAND, OHIO

HYPOCHLORITE BLEACHING COMPOSITION

No Drawing.    Application filed July 24, 1928. Serial No. 295,119.

My invention has reference to an improvement in hypochlorite bleaching compositions or compounds used in the arts and trades wherever hypochlorites may be used such as sterilizers, deodorizers or in the process of bleaching materials such as cottons, linens and other plant fibres, textile goods and other materials.

I have discovered that by adding a soluble fluosilicate, such as sodium fluosilicate or hydrogen fluosilicate (fluosilicic acid) to hypochlorite compounds, such as sodium or calcium hypochlorite, a chemical reaction takes place in solution, and as a result, the hypochlorite becomes activated, yet its activity is so controlled or regulated that violence in reaction and spontaneous decomposition are eliminated.

In the above mentioned chemical reaction, free alkali present in the hypochlorite is neutralized without spontaneously decomposing the hypochlorite, as with an acid, and colloidal silicon hydroxide and a fluoride, such as of sodium or calcium, are formed. There appears to be a direct combination between the colloidal silicon hydroxide and the hypochlorite which activates, stabilizes and controls the hypochlorite and the formation of this combination with the neutralization of the deterring alkali seems to be responsible for this remarkable activation and controlling action. In the soft hypochlorites, such as sodium hypochlorite, the soluble fluoride formed is also of value because it functions as a softener or protector, causing the precipitation of any metals such as calcium and magnesium which might exist as contaminations in solutions prepared for commercial use. With the hard bleaches, such as calcium hypochlorite, I propose to add before, with, or after the fluosilicate a suitable quantity of soluble fluoride, such as potassium or sodium fluoride, for the purpose of precipitating the hardness forming metals, such as calcium and magnesium, which would be antagonistic in such arts and trades as laundering.

Since fluosilicates and fluorides are not appreciably destructive to fabrics, the possibility of danger through addition of an excess need not be considered when this invention is used in conjunction with the bleaching of textiles, etc.

The hypochlorite compounds may be obtained from any suitable source and used in any physical state, two methods of producing these compounds in dry form being disclosed by way of example in U. S. Patents Nos. 1,481,039 and 1,481,040, issued January 5, 1924, to Taylor et al.

In the practice of my invention or discovery, I may create a composition by mixing together in the dry state in suitable proportions, any of the hypochlorite and fluosilicate compounds. When such a mixture is dissolved in water, the chemical reactions take place producing the above mentioned improved hypochlorite compositions. In cases where a hard bleach, such as calcium hypochlorite is used, it is part of my invention, if I choose, to mix along with the fluosilicate sufficient of a soluble fluoride, such as KF, dry, or in a solution to precipitate the calcium, etc., producing a soft hypochlorite composition which would not be antagonistic in washing processes, etc.

I have found that similar results may be obtained by directly passing gaseous silicon tetrafluoride into a solution of the hypochlorites to be activated, thus obtaining soluble fluosilicates in the presence of the hypochlorites which then react to activate the hypochlorites.

The term fluosilicate has been used in the specification and claims as including not only fluosilicate salts, such as the fluosilicate compounds of the alkali metals, but also hydrogen fluosilicate or fluosilicic acid.

It will be understood that this improved hypochlorite composition may be produced so that any or all of the participating chemicals may be mixed in any order and any physical state, liquid or solid.

As an illustration, one of the specific ways in which my invention can be satisfactorily applied in the laundry and textile fields is as follows: To a solution of sodium hypochlorite, made from bleaching powder, liquid chlorine and alkali, electrolysis of salt or any other method, add a solution of sodium fluosilicate.

If I should prefer to use hypochlorites of metals, such as calcium, I may also add a solution of soluble fluoride, such as sodium or potassium, before, with or after the fluosilicate for the purpose of precipitating the calcium and magnesium, etc., thereby producing a so-called soft soda or potassium hypochlorite composition.

The exact amount to be added for a complete reaction can be determined by analyzing the hypochlorite. A complete reaction might be ideal, though it is seldom necessary for practical purposes to add the exact quantity.

If for example, a sodium hypochlorite bleach having an available chlorine content of about 10 percent, and excess caustic soda of about 4 percent is mixed with about four times its volume of a solution of $Na_2SiF_6$ of about 1 percent and the mixture diluted to about twice its volume, there will be produced an activated bleach of about 1 percent available chlorine with exceptional bleaching properties.

While I have described only one mode of compounding and one way of using my improved hypochlorite composition, such description is intended merely as exemplifying, and does not limit my invention in any way, and it is therefore understood that the materials, such as the kinds of hypochlorite, and fluosilicate and fluorides and their physical state, liquid or solid, their proportions and concentrations, and other details herein recited, may be suitably varied without departing from the spirit and scope of my invention.

Having thus described my invention, I claim and desire to protect by Letters Patent of the United States:

1. An improved hypochlorite composition containing a mixture of a soluble fluosilicate and a hypochlorite compound.

2. An improved hypochlorite composition containing a soluble fluosilicate, a hypochlorite compound, and a soluble fluoride.

3. An improved hypochlorite composition containing a mixture in a dry physical state of a soluble fluosilicate and a hypochlorite compound.

4. An improved hypochlorite composition containing a mixture in a dry physical state of a soluble fluosilicate, a hypochlorite compound, and a soluble fluoride.

5. The method of activating a hypochlorite solution which comprises the addition thereto of a soluble fluosilicate.

6. The method of activating a hypochlorite solution which comprises the addition thereto of a soluble fluosilicate and a soluble fluoride.

7. The method of activating a soluble hypochlorite which comprises neutralizing the free alkali thereof with a soluble fluosilicate without spontaneous decomposition of the hypochlorite.

8. An improved hypochlorite composition comprising a mixture in a dry state of a soluble fluosilicate of an alkali metal, and a metal hypochlorite.

9. An improved hypochlorite composition comprising a mixture in a dry state of a soluble fluosilicate of an alkali metal, a metal hypochlorite, and a soluble fluoride.

10. The method of producing an activated bleach which comprises slowly neutralizing the free alkali of a hypochlorite compound with a fluosilicate in a manner to produce a combination of colloidal silicon hydroxide and a hypochlorite.

11. An improved hypochlorite composition comprising a mixture of a substance selected from the group consisting of soluble fluosilicates, and fluosilicic acid, with a hypochlorite compound.

12. An improved hypochlorite composition comprising a mixture of a substance selected from the group consisting of soluble fluosilicates, and fluosilicic acid, with a hypochlorite compound, and a soluble fluoride.

LLOYD T. HOWELLS.